United States Patent
Lee

(10) Patent No.: US 9,545,566 B2
(45) Date of Patent: Jan. 17, 2017

(54) GAME DEVICE, GAME SYSTEM, GAME CONTROL METHOD, AND INFORMATION STORAGE MEDIUM

(71) Applicant: KONAMI DIGITAL ENTERTAINMENT CO., LTD., Minato-ku, Tokyo (JP)

(72) Inventor: Kuka Lee, Musashino (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 683 days.

(21) Appl. No.: 13/951,676

(22) Filed: Jul. 26, 2013

(65) Prior Publication Data

US 2014/0038717 A1  Feb. 6, 2014

(30) Foreign Application Priority Data

Jul. 31, 2012 (JP) ................. 2012-170388

(51) Int. Cl.
| | |
|---|---|
| A63F 13/06 | (2006.01) |
| A63F 13/20 | (2014.01) |
| A63F 13/573 | (2014.01) |
| A63F 13/426 | (2014.01) |
| A63F 13/537 | (2014.01) |
| A63F 13/2145 | (2014.01) |
| A63F 13/812 | (2014.01) |

(52) U.S. Cl.
CPC .......... *A63F 13/06* (2013.01); *A63F 13/2145* (2014.09); *A63F 13/426* (2014.09); *A63F 13/537* (2014.09); *A63F 13/573* (2014.09); *A63F 13/812* (2014.09)

(58) Field of Classification Search
CPC ...... G06F 3/0428; G06F 3/017; A63F 13/812; A63F 2300/8011; A63F 2300/1075
See application file for complete search history.

(56) References Cited

U.S. PATENT DOCUMENTS

| | | | | |
|---|---|---|---|---|
| 5,288,078 A | * | 2/1994 | Capper | ................... A63F 13/06 345/156 |
| 5,414,256 A | * | 5/1995 | Gurner | ................... A63F 13/06 250/221 |
| 5,616,078 A | * | 4/1997 | Oh | .......................... A63F 13/06 345/156 |
| 6,319,121 B1 | * | 11/2001 | Yamada | .................. A63F 13/10 273/148 B |
| 2004/0009814 A1 | * | 1/2004 | Kim | ........................ A63F 13/08 463/36 |
| 2006/0026536 A1 | * | 2/2006 | Hotelling | .............. G06F 3/0418 715/863 |

(Continued)

FOREIGN PATENT DOCUMENTS

JP    2006-158862 A    6/2006

*Primary Examiner* — Jason Skaarup
*Assistant Examiner* — Alex F. R. P. Rada, II
(74) *Attorney, Agent, or Firm* — Sughrue Mion, PLLC

(57) ABSTRACT

A display control unit of a game device displays an image expressing a contact subject on a game screen. A determination unit determines, based on a first position designated by a user and a second position designated by the user, which of a right hand or a right foot and a left hand or a left foot the contact subject is to be touched with in a game. A contact control unit executes predetermined processing for the contact subject based on a determination result from the determination unit.

13 Claims, 14 Drawing Sheets

(56) References Cited

U.S. PATENT DOCUMENTS

| | | | |
|---|---|---|---|
| 2008/0234022 A1 | 9/2008 | Suzuki et al. | |
| 2009/0013274 A1* | 1/2009 | Haghanegi | A63F 13/06 715/764 |
| 2010/0137063 A1* | 6/2010 | Shirakawa | A63F 13/10 463/31 |
| 2011/0069040 A1* | 3/2011 | Ito | G06F 3/0418 345/178 |
| 2011/0074768 A1* | 3/2011 | Takayama | A63F 13/06 345/419 |
| 2011/0306420 A1* | 12/2011 | Nishimoto | A63F 13/06 463/36 |

* cited by examiner

GAME DEVICE, GAME SYSTEM, GAME CONTROL METHOD, AND INFORMATION STORAGE MEDIUM

CROSS-REFERENCE TO RELATED APPLICATION

The present application claims priority from Japanese application JP 2012-170388 filed on Jul. 31, 2012, the content of which is hereby incorporated by reference into this application.

FIELD OF THE INVENTION

The present invention relates to a game device, a game system, a game control method, and an information storage medium.

DESCRIPTION OF THE RELATED ART

Up to now, there has been known a game device for executing a game in which a character touches a contact subject by using a hand or a foot of the character. For example, Japanese Patent Application Laid-open No. 2006-158862 discloses a game device for executing a soccer game in which a game character kicks a ball with a dominant foot.

SUMMARY OF THE INVENTION

However, in actual soccer, a ball exhibits different behaviors between a case where a player kicks a ball with a right foot and a case where the player kicks the ball with a left foot, but according to conventional technologies, for example, a character kicks the ball with a dominant foot, and hence a user cannot designate the foot with which the character is to kick the ball.

The present invention has been made in view of the above-mentioned problem, and an object thereof is to provide a game device, a game system, a game control method, and an information storage medium which allow a user to designate, for example, a hand or a foot of a character with which the character is to touch a contact subject.

In order to solve the above-mentioned problem, according to an exemplary embodiment of the present invention, there are provided a game device (10) and a game system (70) for executing a game in which a contact subject is touched. The game device (10) and the game system (70) each include: display control means (54) for displaying an image expressing the contact subject on a game screen; means (56) for acquiring a plurality of positions on the game screen, which are designated by a user; determination means (60) for determining, based on a first position designated by the user and a second position designated by the user, which of one of a right hand and a right foot and one of a left hand and a left foot the contact subject is to be touched with in the game; and contact control means (62) for executing processing for the contact subject based on a determination result from the determination means (60).

According to an exemplary embodiment of the present invention, there is provided a game control method for a game in which a contact subject is touched. The game control method includes: displaying an image expressing the contact subject on a game screen; acquiring a plurality of positions on the game screen, which are designated by a user; determining, based on a first position designated by the user and a second position designated by the user, which of one of a right hand and a right foot and one of a left hand and a left foot the contact subject is to be touched with in the game; and executing processing for the contact subject based on a determination result in the determination.

According to an exemplary embodiment of the present invention, there is provided a program for causing a computer for executing a game in which a contact subject is touched to function as: display control means (54) for displaying an image expressing the contact subject on a game screen; means (56) for acquiring a plurality of positions on the game screen, which are designated by a user; determination means (60) for determining, based on a first position designated by the user and a second position designated by the user, which of one of a right hand and a right foot and one of a left hand and a left foot the contact subject is to be touched with in the game; and contact control means (62) for executing processing for the contact subject based on a determination result from the determination means (60).

According to an exemplary embodiment of the present invention, there is provided a non-transitory information storage medium having the above-mentioned program recorded thereon.

According to the exemplary embodiment of the present invention, the user can designate the hand or the foot with which the contact subject is to be touched.

Further, according to the exemplary embodiment of the present invention, the game is a game for causing the contact subject to move; and the contact control means (62) controls a trajectory of the contact subject based on the determination result from the determination means (60).

Further, according to the exemplary embodiment of the present invention, the game is a game for causing the contact subject to move; and the contact control means (62) controls a trajectory of the contact subject based on the determination result from the determination means (60) and at least one of the first position and the second position obtained in a case where determination processing is executed by the determination means (60).

Further, according to the exemplary embodiment of the present invention, the contact control means (62) includes means (62) for determining at least one of a contact strength, a contact direction, and a contact position used in a case where the contact subject is touched based on at least one of the first position and the second position obtained in a case where determination processing is executed by the determination means (60), and the contact control means (62) executes the processing for the contact subject based on the determined at least one of the contact strength, the contact direction, and the contact position.

Further, according to the exemplary embodiment of the present invention, the determination means (60) includes determining means (58) for determining whether or not the first position is included in an area of the game screen corresponding to the image expressing the contact subject, and the determination means (60) determines, based on the second position obtained in a case where it is determined that the first position is included in the area, which of the one of the right hand and the right foot and the one of the left hand and the left foot the contact subject is to be touched with in the game.

Further, according to the exemplary embodiment of the present invention, the game device (10) further includes means (64) for changing at least one of a position and a size of the area based on the second position, and the determining means (58) determines whether or not the first position is included in the changed area.

Further, according to the exemplary embodiment of the present invention, the determination means (60) includes means (66) for determining whether or not the first position has made a given positional change, and the determination means determines, based on the second position obtained in a case where it is determined that the first position has made the given positional change, which of the one of the right hand and the right foot and the one of the left hand and the left foot the contact subject is to be touched with in the game.

Note that reference numerals illustrated in the figures that are parenthesized are described above for an easy understanding of the present invention, but the game device or the like according to the exemplary embodiment of the present invention is not limited to an exemplary embodiment illustrated in the figures.

DETAILED DESCRIPTION OF THE INVENTION

1. Hardware Structure of Game Device

In the following, an exemplary embodiment of the present invention is described in detail with reference to the accompanying drawings. The game device according to the exemplary embodiment of the present invention is implemented by, for example, a portable game machine, mobile phone (smart phone), or personal digital assistant.

Figure 1:
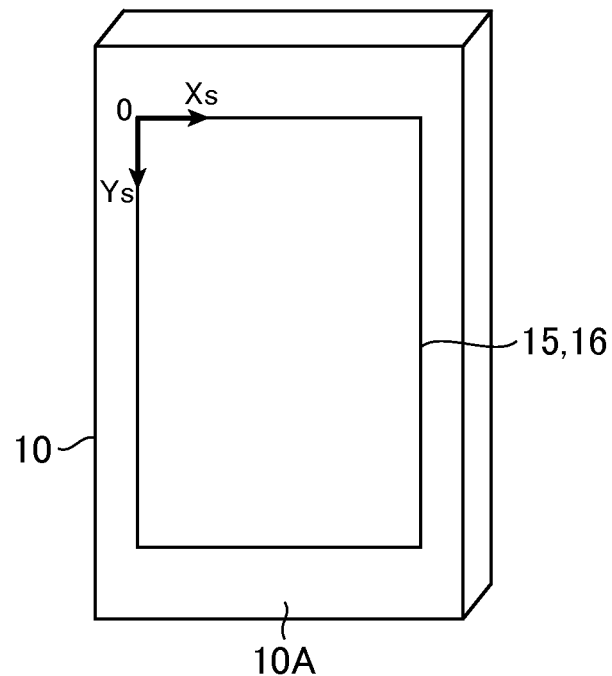
FIG. 1 is a figure illustrating an example of an external appearance of a game device.
Figure 2:
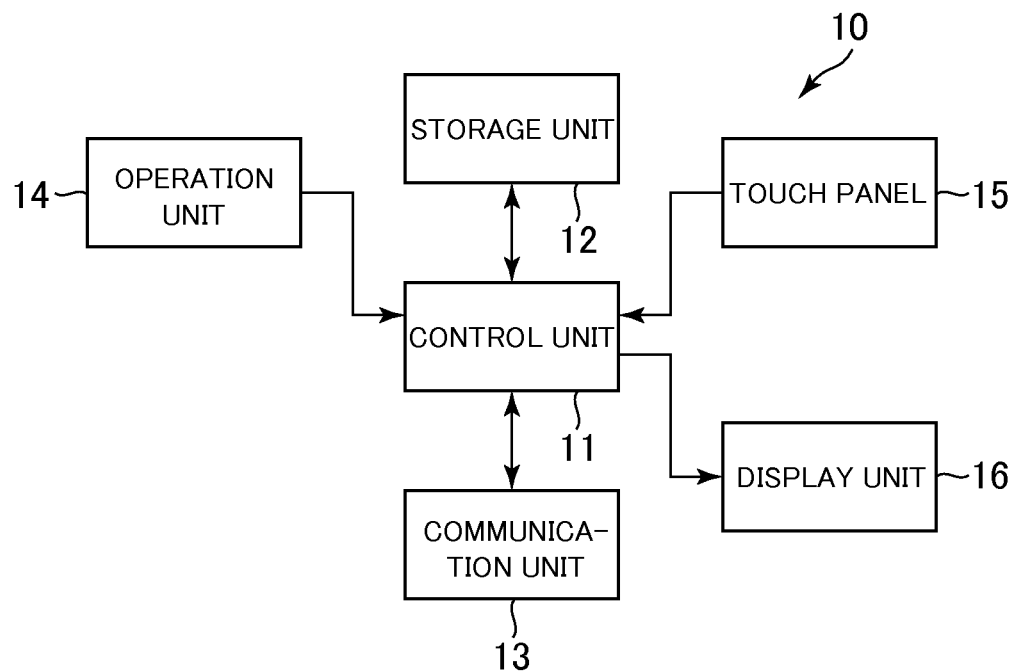
FIG. 2 is a diagram illustrating an example of a hardware structure of the game device.

FIG. 1 is a figure illustrating an example of an external appearance of the game device. Further, FIG. 2 is a diagram illustrating an example of a hardware structure of the game device. As illustrated in FIG. 1 and FIG. 2, a game device 10 includes a control unit 11, a storage unit 12, a communication unit 13, an operation unit 14, a touch panel 15, and a display unit 16.

The control unit 11 includes, for example, at least one microprocessor. The control unit 11 executes processing in accordance with an operating system stored in the storage unit 12 or another program.

The storage unit 12 includes a main memory and a nonvolatile memory. The nonvolatile memory stores a program executed by the control unit 11. For example, the program is downloaded from a server device via a communication network such as the Internet and stored in the nonvolatile memory. Alternatively, the program is copied from a computer-readable information storage medium such as a memory card and stored in the nonvolatile memory. The program read out from the nonvolatile memory and data necessary for the control unit 11 to execute the processing are written into the main memory.

The communication unit 13 is used to perform data communications. For example, the communication unit 13 executes the data communications in accordance with an instruction issued from the control unit 11.

The operation unit 14 includes, for example, buttons, a stick (lever), or a keyboard, and is used by a user to perform an operation.

The touch panel 15 is a general touch panel, and detects a position touched by the user. The touch panel 15 is configured to detect a plurality of positions touched by the user. As the touch panel 15, for example, a capacitive touch panel is used. On the capacitive touch panel, the position touched by the user is detected based on a change of charge caused when a front surface of the touch panel 15 is touched by the user. The position touched by the user is represented by a coordinate value within such a Xs-Ys coordinate system as illustrated in, for example, FIG. 1, in which the left-top vertex of the touch panel 15 is set as an origin O with the right direction and the down direction set as a positive Xs-axis direction and a positive Ys-axis direction, respectively.

The touch panel 15 supplies information corresponding to the position touched by the user to the operating system. The operating system acquires the position being touched by the user based on the information supplied from the touch panel 15. For example, in a case where a plurality of positions are being touched by the user, the operating system acquirers a plurality of contact positions, and stores in the storage unit 12 contact position data indicating the plurality of contact positions. The contact position data stored in the storage unit 12 by the operating system is referred to by programs other than the operating system.

Note that the touch panel 15 is overlaid on the display unit 16 described later. Therefore, the user can designate a position within a screen displayed on the display unit 16 by touching the front surface of the touch panel 15. Note that the user may bring their own finger (hand) into contact with the front surface of the touch panel 15, or may bring a body part other than the finger (hand) into contact with the front surface of the touch panel 15. Alternatively, for example, an object (such as stylus) grasped by the user may be brought into contact with the front surface of the touch panel 15.

The display unit 16 is, for example, a liquid crystal panel. The display unit 16 displays the screen in accordance with the instruction issued from the control unit 11.

Note that the game device 10 may include an optical disc drive or a memory card slot. The optical disc drive is used for reading a program and data recorded on an optical disc (information storage medium). The memory card slot is used for reading a program and data recorded on a memory card (information storage medium). The program and the data may be supplied to the game device 10 via the optical disc or the memory card, and stored in the storage unit 12 (nonvolatile memory). Further, the program and the data, which is described as being stored in the information storage medium, may be acquired from a network via the communication unit 13.

2. Game Executed in Game Device

The game device 10 executes a game in which a contact subject is touched by executing a game program read out from the storage unit 12. In this embodiment, the description is directed to a case of executing a soccer game in which a character operated by the user kicks a ball with a right foot or a left foot to move the ball. When the soccer game begins, for example, a game space is constructed in the storage unit 12.

Figure 3:
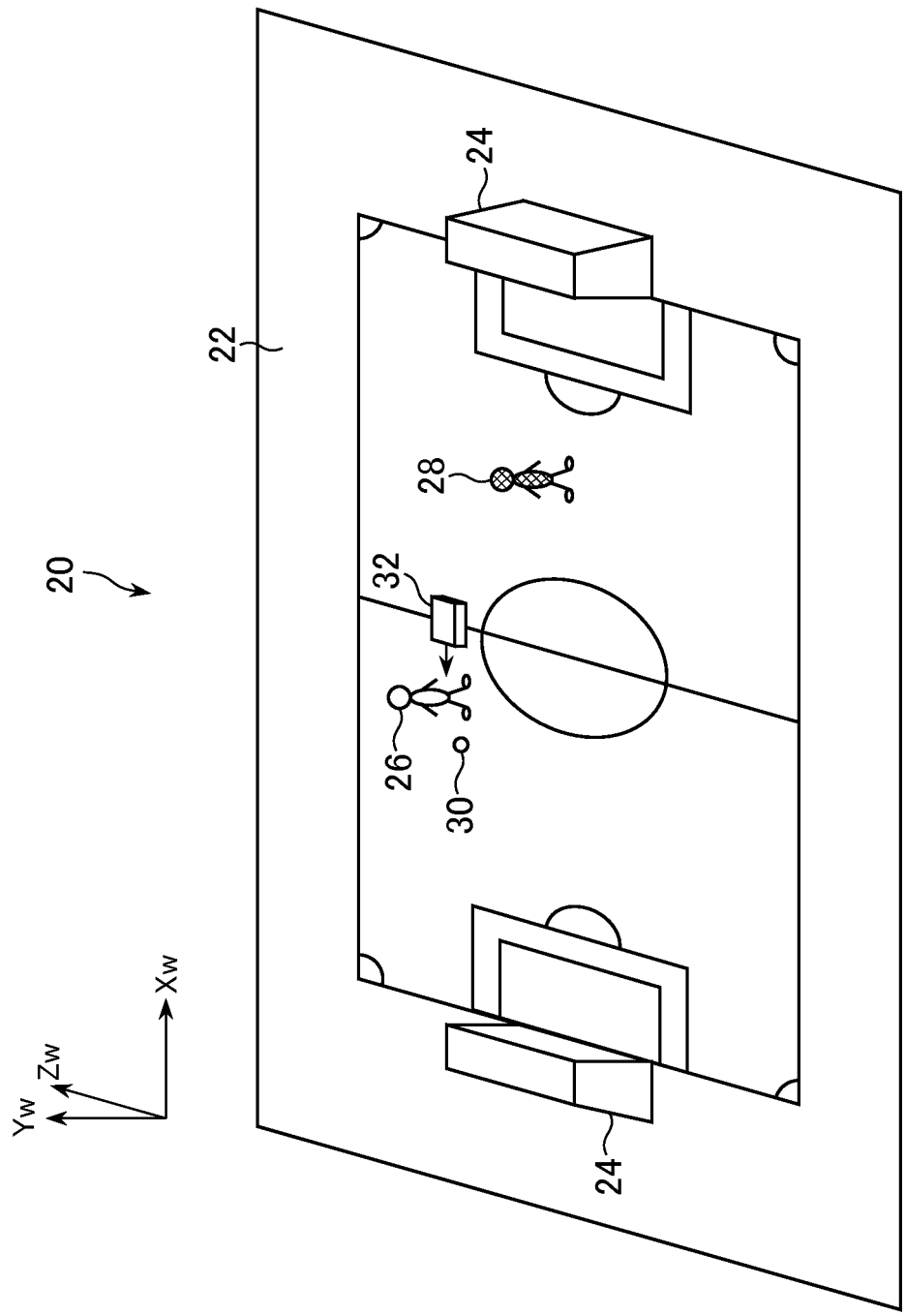
FIG. 3 is a figure illustrating an example of a game space.

FIG. 3 is a figure illustrating an example of the game space. A game space 20 is a virtual three-dimensional space in which three coordinate axes (Xw-axis, Yw-axis, and Zw-axis) that are orthogonal to one another are set. A position of each object placed in the game space 20 is identified by, for example, three-dimensional coordinates of a world coordinate system (Xw-Yw-Zw coordinate system).

As illustrated in FIG. 3, a field 22 being an object representing a soccer field is placed in the game space 20. On the field 22, a soccer match is played between a team operated by the user (hereinafter referred to as "user team") and a team operated by an opponent (computer or another user) (hereinafter referred to as "opponent team").

Placed on the field 22 are goals 24 being objects representing soccer goals, a character 26 being an object representing a soccer player belonging to the user team, a character 28 being an object representing a soccer player belonging to the opponent team, and a ball 30 being an object representing a soccer ball (moving object). Note that on the field 22, there are arranged eleven characters 26 belonging to the user team and eleven characters 28 belonging to the opponent team, which are not shown in FIG. 3.

Any one of the eleven characters 26 belonging to the user team operates based on the user's operation, and the other characters 26 and the eleven characters 28 belonging to the opponent team operate autonomously based on a given behavior algorithm.

Further, a virtual camera 32 (point of view) is set up in the game space 20. The display unit 16 displays a game screen expressing how the game space 20 is viewed from the virtual camera 32. The game screen is generated by coordinate-converting vertex coordinates of the respective objects arranged in the game space 20 from the world coordinate system into a screen coordinate system by using a predetermined coordinate conversion operation.

Figure 4:
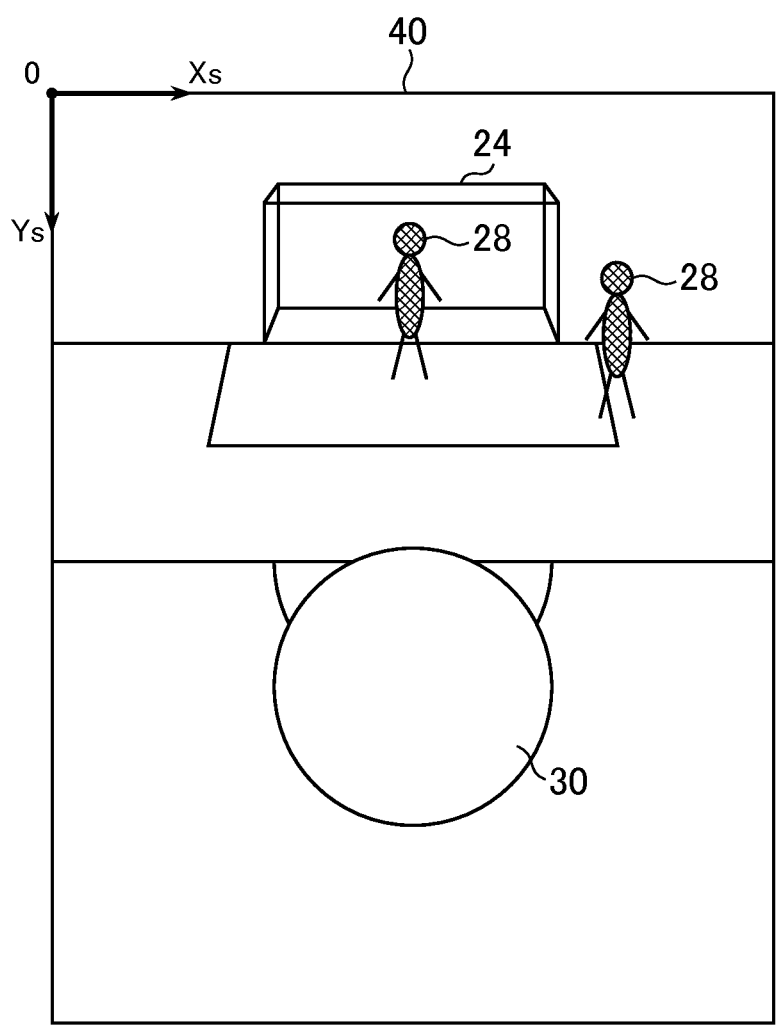
FIG. 4 is a figure illustrating an example of a game screen.

FIG. 4 is a figure illustrating an example of the game screen. As illustrated in FIG. 4, the objects included in a visual field of the virtual camera 32 are displayed on a game screen 40. Note that in this screen example, the virtual camera 32 is located in a position spaced apart from the ball 30 by a predetermined distance so that a direction extending from the ball 30 toward the goal 24 associated with the opponent team coincides with a line of sight. In a state illustrated in FIG. 4, the user performs different kinds of operation for the ball 30 displayed on the game screen 40 by touching the touch panel 15. For example, when the user taps the ball 30 displayed on the game screen 40, the character 26 dribbles or passes the ball 30.

In this embodiment, by using the two fingers to perform a given operation on the touch panel 15, the user can designate which of the right foot and the left foot of the character 26 is used to kick the ball 30. Note that the user's operation method is described below by taking an example of a scene of a free kick (kick performed without being interfered with by the opponent when a foul or the like occurs during a match).

Figure 5:
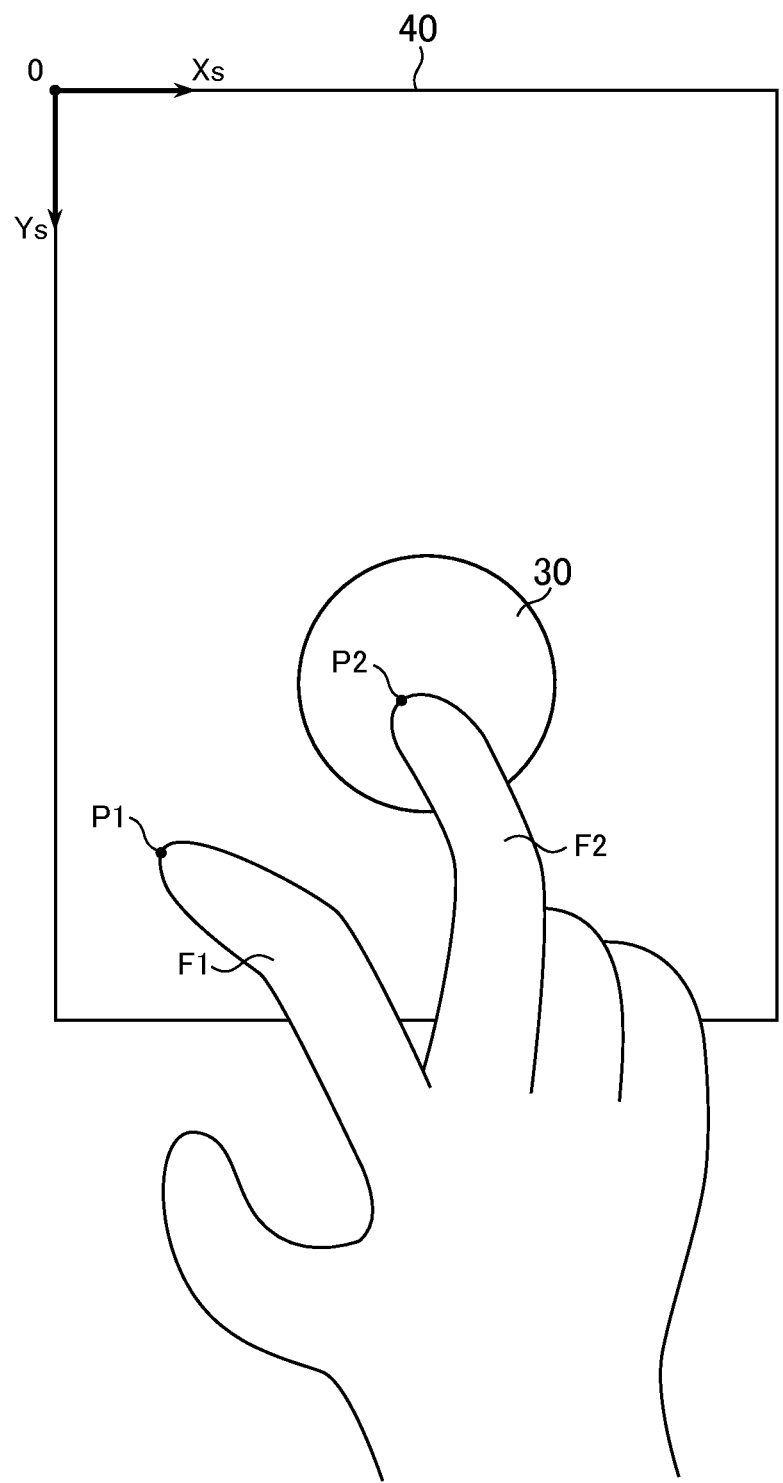
FIG. 5 is a figure for illustrating a user's operation method performed in a case where a character kicks a ball.
Figure 6:
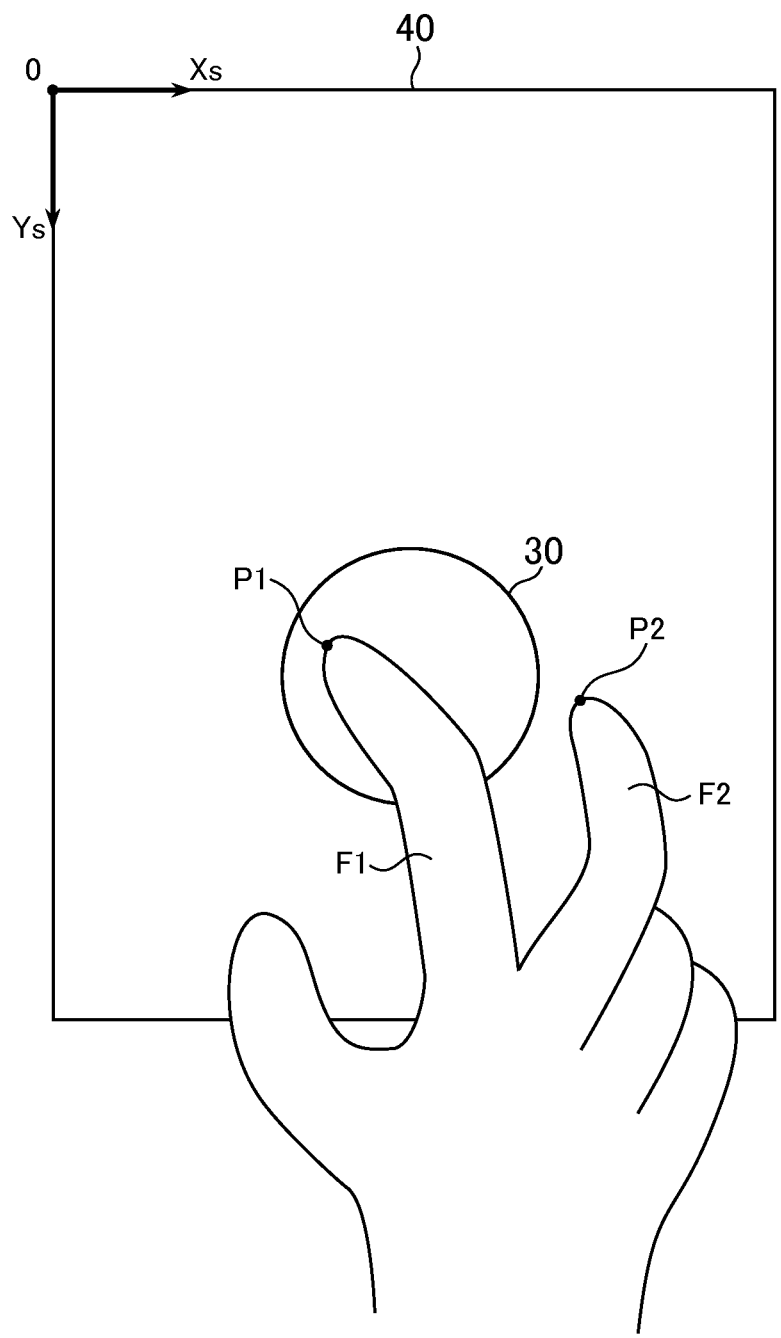
FIG. 6 is a figure for illustrating another user's operation method performed in the case where the character kicks the ball.

FIG. 5 and FIG. 6 are figures for illustrating the user's operation method performed when the character 26 is to kick the ball 30. When, as illustrated in FIG. 5, the user touches a left side of the ball 30 with an index finger F1 thereof (with the touched position set as a position P1) and then touches the ball 30 with a middle finger F2 thereof (with the touched position set as a position P2) without releasing the index finger F1, the character 26 kicks the ball 30 with the right foot. In other words, in a case illustrated in FIG. 5, the index finger F1 serves as a pivot foot (in this case, left foot) used when the character 26 kicks the ball 30, and the middle finger F2 serves as a kicking foot (in this case, right foot) used when the character 26 kicks the ball 30.

When, as illustrated in FIG. 6, the user touches a right side of the ball 30 with the middle finger F2 thereof and then touches the ball 30 with the index finger F1 thereof without releasing the middle finger F2, on the other hand, the character 26 kicks the ball 30 with the left foot. In a case illustrated in FIG. 6, the middle finger F2 serves as the pivot foot (in this case, right foot) used when the character 26 kicks the ball 30, and the index finger F1 serves as the kicking foot (in this case, left foot) used when the character 26 kicks the ball 30.

The game device 10 according to this embodiment is thus configured, which can designate the foot with which the character 26 is to kick the ball 30 based on a positional relationship between the two fingers exhibited when the user touches the ball 30 displayed on the game screen 40. This configuration is described below in detail.

3. Functions Implemented in Game Device

Figure 7:
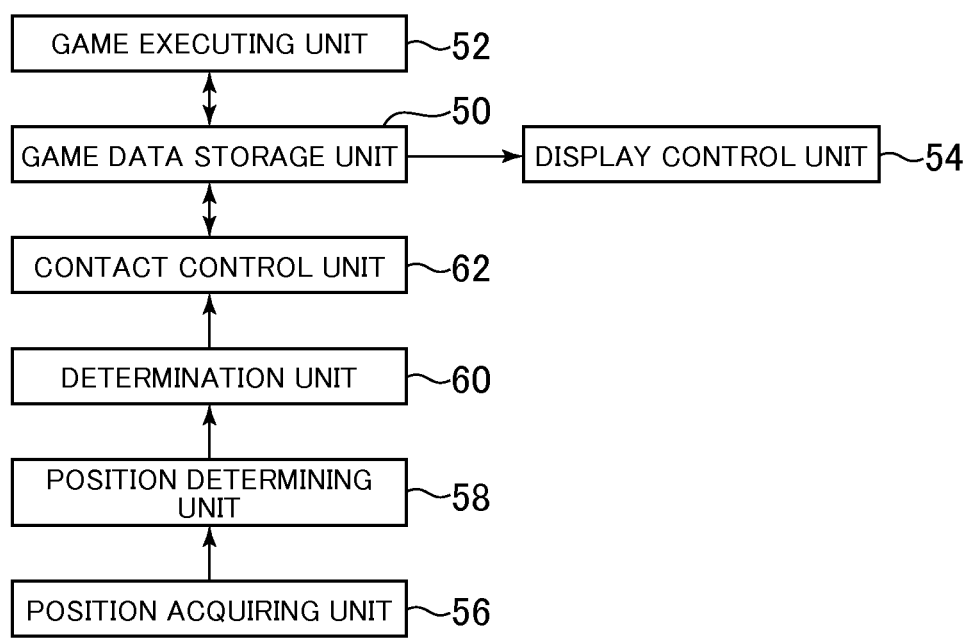
FIG. 7 is a functional block diagram of the game device.

FIG. 7 is a functional block diagram of the game device 10. As illustrated in FIG. 7, the game device 10 includes a game data storage unit 50, a game executing unit 52, a display control unit 54, a position acquiring unit 56, a position determining unit 58, a determination unit 60, and a contact control unit 62. The game device 10 implements the respective functions illustrated in FIG. 7 by executing the game program stored in the storage unit 12. The game data storage unit 50 is implemented mainly by, for example, the storage unit 12, and the other respective functions are implemented mainly by, for example, the control unit 11.

[3-1. Game Data Storage Unit]

The game data storage unit 50 stores, for example, data necessary to implement the soccer game. For example, the game data storage unit 50 stores game situation data indicating a situation of a running game. The game situation data includes data indicating a current situation of the game space 20 (such as data indicating the positions and the vertex coordinates of the respective objects and data indicating the position and the line of sight of the virtual camera 32).

Further, the game data storage unit 50 stores an algorithm relating to a behavior of the ball 30 exhibited when the character 26 touches the ball 30. For example, the game data storage unit 50 stores an algorithm used by the contact control unit 62 to calculate a trajectory of the ball 30. In this embodiment, the algorithm includes a mathematical expression for substituting numerical values relating to a plurality of factors (here, set as three factors of contact strength, contact direction, and contact position) regarding contact or touching (or striking).

Note that the control unit 11 functions as means for acquiring or updating the data stored in the game data storage unit 50. Further, the data stored in the game data storage unit 50 is not limited to the above-mentioned example. Alternatively, for example, the game data storage unit 50 may be configured to store data relating to different kinds of image displayed on the game screen 40, motion data indicating an action of the character 26 (28), or the like.

[3-2. Game Executing Unit]

The game executing unit 52 executes the game in which the contact subject (for example, ball 30) is touched. The contact subject is a given object touched by the user's operation among the objects arranged in the game space 20. Here, the ball 30 kicked by the character 26 corresponds to the contact subject. Here, the game executing unit 52 executes a game for causing the contact subject (for example, ball 30) to move. When the character 26 touches the ball 30, the ball 30 moves within the game space 20 based on a given algorithm.

[3-3. Display Control Unit]

The display control unit 54 displays an image expressing the contact subject (for example, ball 30) on the game screen 40. In this embodiment, the display control unit 54 displays an image expressing how the game space 20 is viewed from the virtual camera 32 on the game screen 40, to thereby display the ball 30 on the game screen 40. The display control unit 54 coordinate-converts the objects included in the visual field of the virtual camera 32, to thereby perform display control of the game screen 40.

Note that a display control method performed by the display control unit 54 is not limited to the above-mentioned example. Alternatively, for example, while image data on an image expressing the ball is stored in advance in the game data storage unit 50, the display control unit 54 may be configured to display the image expressing the ball at a predetermined position on the game screen 40 based on the image data.

[3-4. Position Acquiring Unit]

The position acquiring unit 56 acquires a plurality of positions (for example, first position and second position) on the game screen 40 that are designated by the user. The position acquiring unit 56 receives a signal from at least one of pointing devices (for example, touch panel 15), to thereby acquire the plurality of positions on the game screen 40. In this embodiment, the position acquiring unit 56 acquires, from the touch panel 15, information (for example, two-dimensional coordinates of the Xs-Ys coordinate system) relating to the first position on the game screen 40 pointed at by the user with a first finger and the second position on the game screen 40 pointed at by the user with a second finger.

[3-5. Position Determining Unit]

The position determining unit 58 determines whether or not the first position is included in an area (hereinafter referred to as "subject area") of the game screen 40 corresponding to the image expressing the contact subject (for example, ball 30). The subject area is an area defined based on the display position of the ball 30 within a display area of the game screen 40, and is, for example, a predetermined area set inside the ball 30. This embodiment is described by taking a case where an area formed of pixels included in the ball 30 within the display area of the game screen 40 corresponds to the subject area.

[3-6. Determination Unit]

The determination unit 60 determines which of a right hand or a right foot and a left hand or a left foot is used to touch the contact subject (for example, ball 30) in the game, based on the first position and the second position designated by the user (for example, based on a positional relationship between the first position and the second position).

In this embodiment, when it is determined that the first position is included in the subject area (for example, display area of the ball 30), the determination unit 60 determines, based on the positional relationship between the first position or the subject area and the second position, which of the right hand or the right foot and the left hand or the left foot is used to touch the contact subject (for example, ball 30) in the game.

Figure 8:
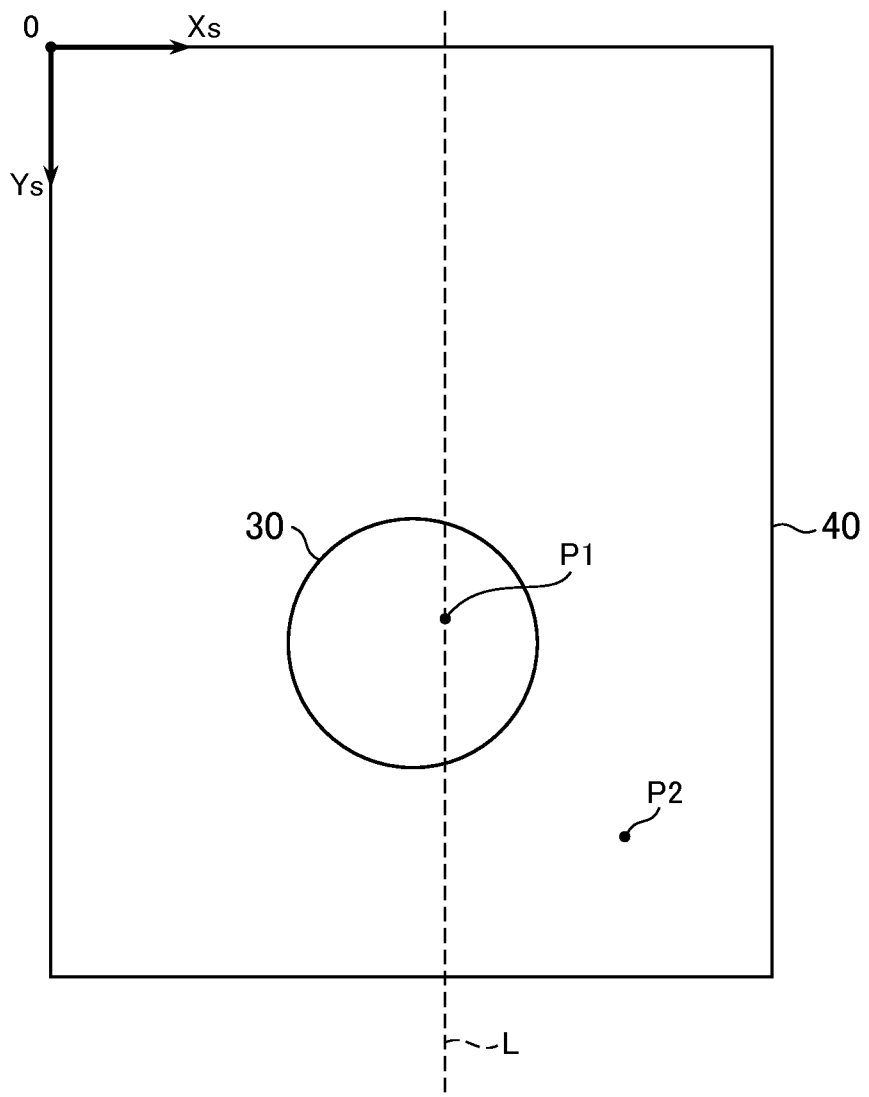
FIG. 8 is a figure for illustrating processing details of a determination unit.

FIG. 8 is a figure for illustrating processing details of the determination unit 60. In the example of FIG. 8, the position P1 pointed at by the user with the index finger F1 falls within the ball 30, and hence the position P1 corresponds to the first position while the position P2 pointed at by the user with the middle finger F2 corresponds to the second position.

For example, the determination unit 60 divides the game screen 40 with a straight line L extending along the Ys-axis direction through the position P1, and determines which of a right side and a left side of the straight line L the position P2 belongs to. For example, when the position P2 belongs to the right side of the straight line L, the determination unit 60 determines that the character 26 is to kick the ball 30 with the left foot. Alternatively, for example, when the position P2 belongs to the left side of the straight line L, the determination unit 60 determines that the character 26 is to kick the ball 30 with the right foot.

Note that the description has been made with reference to FIG. 8 by taking the case where the foot to be used to kick the ball 30 is determined based on the positional relationship between the first position and the second position, but the foot to be used to kick the ball 30 may be determined based on a positional relationship between the ball 30 and the second position. In this case, the foot with which the character 26 is to kick the ball 30 is determined based on which of the right side and the left side of the straight line, which extends along the Ys-axis direction through a representative point (for example, center point of the ball 30) within the subject area, the second position (in the example of FIG. 8, position P2) belongs to. For example, it is determined that the character 26 is to kick the ball 30 with the left foot when the second position belongs to the right side of the straight line, and when the second position belongs to the left side of the straight line, it is determined that the character 26 is to kick the ball 30 with the right foot.

Further, this embodiment is described by taking the case where the user designates the second position corresponding to the pivot foot of the character 26 and then designates the first position corresponding to the kicking foot of the character 26, but the first position corresponding to the kicking foot of the character 26 may be designated before the second position corresponding to the pivot foot of the character 26 is designated. In other words, the user may touch an inside of the ball 30 and then touch a position around the ball 30 without releasing the first finger. In this case, too, the same processing is executed as in the determination unit 60 described above, and the foot with which the character 26 is to kick the ball 30 is determined based on the positional relationship between the first position or the ball 30 and the second position.

[3-7. Contact Control Unit]

The contact control unit 62 executes processing for the contact subject (for example, ball 30) based on a determination result from the determination unit 60. The processing represents processing performed when the ball 30 is touched in the game, and here includes processing for determining whether or not the character 26 hits the ball 30 and motion control processing for the ball 30.

In this case, the contact control unit 62 causes the character 26 to touch the ball 30 with the right foot when it is determined that the character 26 is to touch the ball 30 with the right foot, and causes the character 26 to touch the ball 30 with the left foot when it is determined that the character 26 is to touch the ball 30 with the left foot. For example, based on the determination result from the determination unit 60, the contact control unit 62 determines values of the respective factors (here, contact strength, contact direction, and contact position) assumed when the ball 30 is touched. The contact control unit 62 substitutes the determined values of the respective factors into the given algorithm, to thereby execute contact processing for the ball 30 in the game.

Based on the determination result from the determination unit 60, the contact control unit 62 controls the trajectory of the contact subject (for example, ball 30) to be moved. When it is determined that the character 26 is to touch the ball 30 with the right foot, the contact control unit 62 causes the ball 30 to move along a trajectory used when the character 26 touches the ball 30 with the right foot, and when it is determined that the character 26 is to touch the ball 30 with the left foot, causes the ball 30 to move along a trajectory used when the character 26 touches the ball 30 with the left foot.

For example, when the character 26 is to touch the ball 30 with the right foot, the contact control unit 62 causes the character 26 to touch and move the ball 30 based on a first contact strength, a first contact direction, and a first contact position. Further, for example, when the character 26 is to touch the ball 30 with the left foot, the contact control unit 62 causes the character 26 to touch and move the ball 30 based on a second the contact strength, a second contact direction, and a second contact position.

The contact strength represents a magnitude of a force applied by an object (for example, foot of the character 26) brought into contact with the contact subject (for example, ball 30), and here includes a striking strength (kicking force) applied when the character 26 kicks the ball 30. The contact direction represents a movement direction (direction of the force) of the object (for example, foot of the character 26) brought into contact with the contact subject (for example, ball 30), and here includes a striking direction used when the character 26 kicks the ball 30. The contact position represents a position touched by the object brought into contact with the contact subject (for example, ball 30), and here includes a striking position used when the character 26 kicks the ball 30.

As those factors of the striking strength, the striking direction, and the striking position, predefined values may be used, or values generated as a result of arithmetic operation processing using a given mathematical expression may be used. Further, a first striking strength, a first striking direction, and a first striking position may be the same as or different from a second striking strength, a second striking direction, and a second striking position, respectively.

For example, the first striking strength may be stronger or weaker than the second striking strength. Further, for example, the first striking direction may extend further leftward than the second striking direction when viewed from the virtual camera 32. Further, for example, the first striking position may be located further rightward than the second striking direction when viewed from the virtual camera 32.

4. Processing Executed in Game Device

Figure 9:
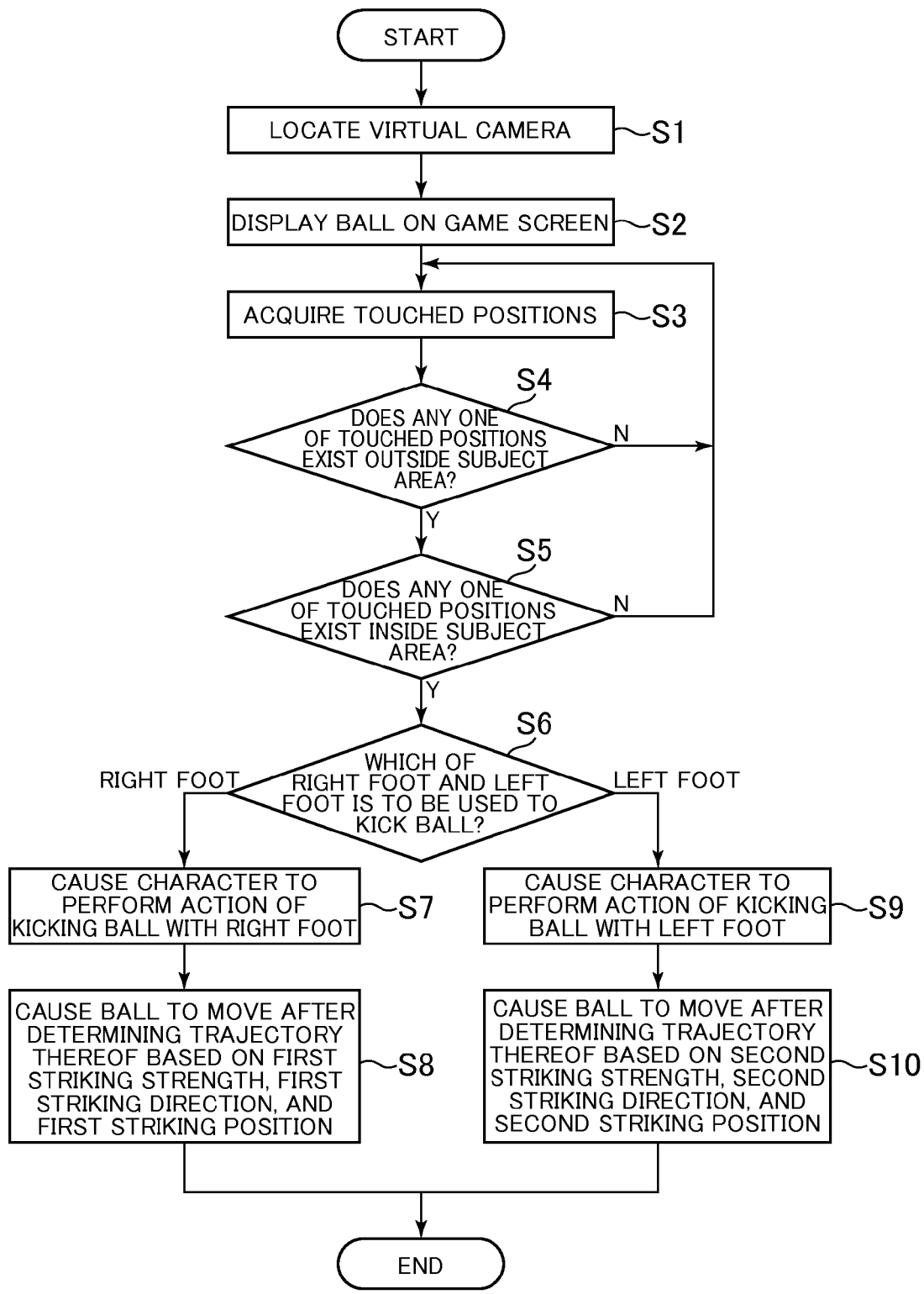
FIG. 9 is a flowchart illustrating processing executed by the game device.

FIG. 9 is a flowchart illustrating processing executed by the game device 10. The control unit 11 executes the processing illustrated in FIG. 9 in accordance with the program stored in the storage unit 12 when a free kick situation arrives in the game.

First, as illustrated in FIG. 9, the control unit 11 locates the virtual camera 32 in a place spaced apart from the ball 30 by a predetermined distance (S1). In Step S1, the control unit 11 determines the position and the line of sight of the virtual camera 32 so as to include the ball 30 in the visual field of the virtual camera 32.

The control unit 11 displays the ball 30 on the game screen 40 by displaying an image expressing how the game space 20 is viewed from the virtual camera 32 on the game screen 40 (S2). In Step S2, the control unit 11 displays the ball 30 and the like on the game screen 40 by coordinate-converting the respective objects of the ball 30 and the like included in the visual field of the virtual camera 32.

The control unit 11 acquires a position (hereinafter referred to as "touched position") on the game screen 40 pointed at by the user based on a detection signal received from the touch panel 15 (S3). In this embodiment, the touch panel 15 that can detect a plurality of contact positions is used, and hence, in Step S3, the control unit 11 detects a plurality of touched positions on the game screen 40.

The control unit 11 determines whether or not any one of the touched positions acquired in Step S3 exists outside the subject area (for example, outside the ball 30) within the game screen 40 (S4). In Step S4, the control unit 11 determines whether or not the two-dimensional coordinates (coordinates expressed by the Xs-Ys coordinate system) acquired in Step S3 are included in an outside area of the ball 30 displayed on the game screen 40.

When it is determined that any one of the touched positions acquired in Step S3 exists outside the subject area (Y in S4), the control unit 11 determines whether or not any one of the touched positions acquired in Step S3 exists inside the subject area (for example, inside the ball 30) (S5). In Step S5, the control unit determines whether or not the two-dimensional coordinates (coordinates expressed by the Xs-Ys coordinate system) acquired in Step S3 are included in an inside area of the ball 30 displayed on the game screen 40.

When it is determined that any one of the touched positions acquired in Step S3 exists inside the subject area (Y in S5), the control unit 11 determines, based on the positional relationship between the touched position (first position) existing inside the subject area and the touched position (second position) existing outside the subject area, which of the right foot and the left foot the character 26 is to kick the ball 30 with (S6).

When it is determined that the character 26 is to kick the ball 30 with the right foot (right foot in S6), the control unit 11 causes the character 26 to perform an action of kicking the ball 30 with the right foot in the game space 20 (S7). In Step S7, the control unit 11 reproduces a motion of the character 26 kicking the ball 30 with the right foot.

The control unit 11 causes the ball 30 to move after determining the trajectory thereof based on the first striking strength, the first striking direction, and the first striking position (S8). In Step S8, the control unit 11 executes determination as to whether or not the right foot of the character 26 hits the ball 30, and when the right foot of the character 26 is brought into contact with the ball 30, causes the ball 30 to move along the trajectory calculated by substituting the first striking strength, the first striking direction, and the first striking position into the given mathematical expression.

When it is determined that the character 26 is to kick the ball 30 with the left foot (left foot in S6), on the other hand, the control unit 11 causes the character 26 to perform an action of kicking the ball 30 with the left foot in the game space 20 (S9). In Step S9, the control unit 11 reproduces a motion of the character 26 kicking the ball 30 with the left foot.

The control unit 11 causes the ball 30 to move after determining the trajectory thereof based on the second striking strength, the second striking direction, and the second striking position (S10). In Step S10, the control unit 11 executes determination as to whether or not the left foot of the character 26 hits the ball 30, and when the left foot of the character 26 is brought into contact with the ball 30, causes the ball 30 to move along the trajectory calculated by substituting the second striking strength, the second striking direction, and the second striking position into the given mathematical expression.

According to the game device 10 described above, it can be determined, based on the touched position within the ball 30 and the touched position around the ball 30, which of the right foot and the left foot the character 26 is to kick the ball 30 with. For example, the foot with which the character 26 is to kick the ball 30 can be determined based on the positional relationship between the fingers exhibited when the user touches the ball 30 on the game screen 40.

Further, with a relationship between the pivot foot and the kicking foot exhibited when the ball is actually kicked expressed on the game screen 40, the user is allowed to designate the foot with which the character 26 is to kick the ball 30, and can therefore operate in an intuitive way. Further, the trajectory of the ball 30 can be determined based on the foot with which the character 26 kicks the ball 30.

5. Modified Examples

The present invention is not to be limited to the embodiment described above and can be changed as appropriate without departing from the spirit of the present invention.

Figure 10:
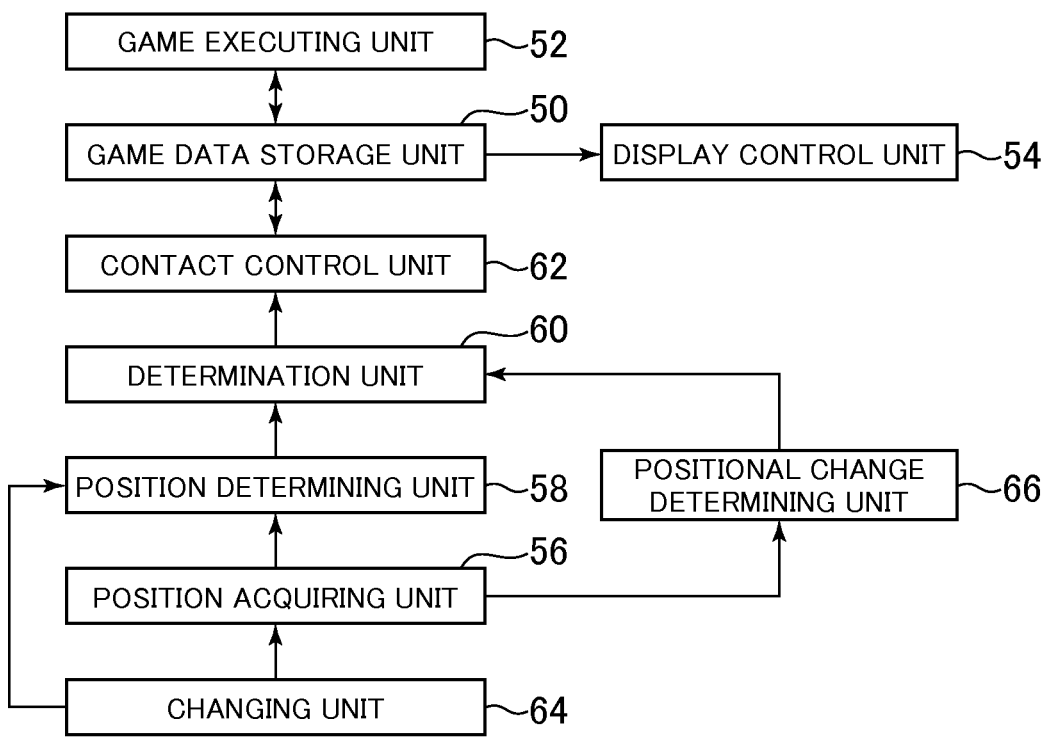
FIG. 10 is a functional block diagram of first to fourth modified examples.

FIG. 10 is a functional block diagram of first to fourth modified examples. As illustrated in FIG. 10, in addition to the functions according to the embodiment, the game device 10 according to each of the first to fourth modified examples includes a changing unit 64 and a positional change determining unit 66. Those respective functions are implemented by the control unit 11 executing the program stored in the storage unit 12. Further, those respective functions are implemented mainly by the control unit 11.

(1) For example, at least one of the striking strength, the striking direction, and the striking position of the ball 30 may be changed based on the position touched by the user, to thereby change the trajectory of the ball 30 used when the character 26 kicks the ball 30.

The contact control unit 62 according to the first modified example determines the trajectory, which is used to cause the contact subject (for example, ball 30) to move, based on the determination result from the determination unit 60 and at least one of the first position and the second position obtained in a case where determination processing is executed by the determination unit 60. The case where the determination processing is executed by the determination unit 60 indicates one of: a time point when it is determined that the first position is included in the ball 30 or a time point (see the third modified example) when it is determined that the first position has made a given positional change; and a time point a predetermined time before or after the above-mentioned time point.

Based on at least one of the first position and the second position obtained when the determination processing is executed by the determination unit 60, the contact control unit 62 determines at least one of the contact strength (for example, striking strength), the contact direction (for example, striking direction), and the contact position (for example, striking position) assumed when the contact subject is touched. The contact control unit 62 executes the processing for the contact subject (for example, ball 30) based on the determination result from the determination unit 60 and at least one of the striking strength, the striking direction, and the striking position determined in the above-mentioned manner.

Figure 11:
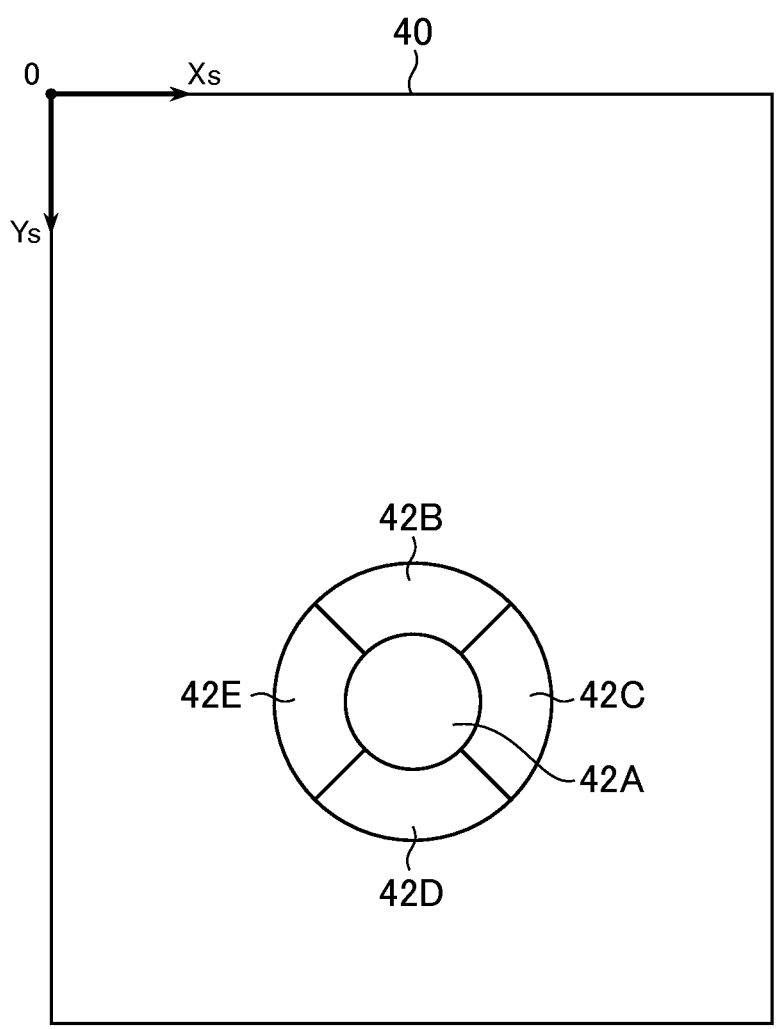
FIG. 11 is a figure for illustrating a method of determining a trajectory of the ball based on a first position.

For example, the contact control unit 62 determines the trajectory of the ball 30 based on a positional relationship between the subject area and the first position. FIG. 11 is a figure for illustrating a method of determining a trajectory of the ball 30 based on the first position. As illustrated in FIG. 11, for example, the subject area is divided into a plurality of small areas 42A to 42E (also collectively referred to simply as "small area 42"). The contact control unit 62 determines the trajectory of the ball 30 based on the small area 42 including the first position among the plurality of small area 42 obtained by the division.

For example, an association between each small area 42 and at least one of the striking strength, the striking direction, and the striking position is stored in the game data storage unit 50. The association may have a mathematical expression format or may have a table format. The same applies to associations described below. The contact control unit 62 causes the character 26 to touch the ball 30 based on at least one of the striking strength, the striking direction, and the striking position associated with the small area 42 including the first position.

For example, the striking strength is set larger as the first position becomes closer to a center of the ball 30. In other words, the character 26 is to kick the ball 30 harder as the first position touched by the user becomes closer to the center of the ball 30 (as the position at which the character 26 is to kick the ball 30 becomes closer to the center). Further, for example, the striking direction is set so that an angle between the striking direction and a front direction of the ball 30 (or line of sight of the virtual camera 32) becomes smaller as the first position becomes closer to the center of the ball 30. In other words, as the first position touched by the user becomes closer to the center of the ball 30 (as the position at which the character 26 is to kick the ball 30 becomes closer to the center), the direction in which the character 26 is to kick the ball 30 becomes closer to the front direction (line of sight of the virtual camera 32), and a flying direction of the ball 30 becomes closer to the front direction. Further, for example, the first position is set as the striking position. In other words, the position of a surface of the ball 30 corresponding to the first position touched by the user is used as the striking position when the character 26 kicks the ball 30.

Figure 12:
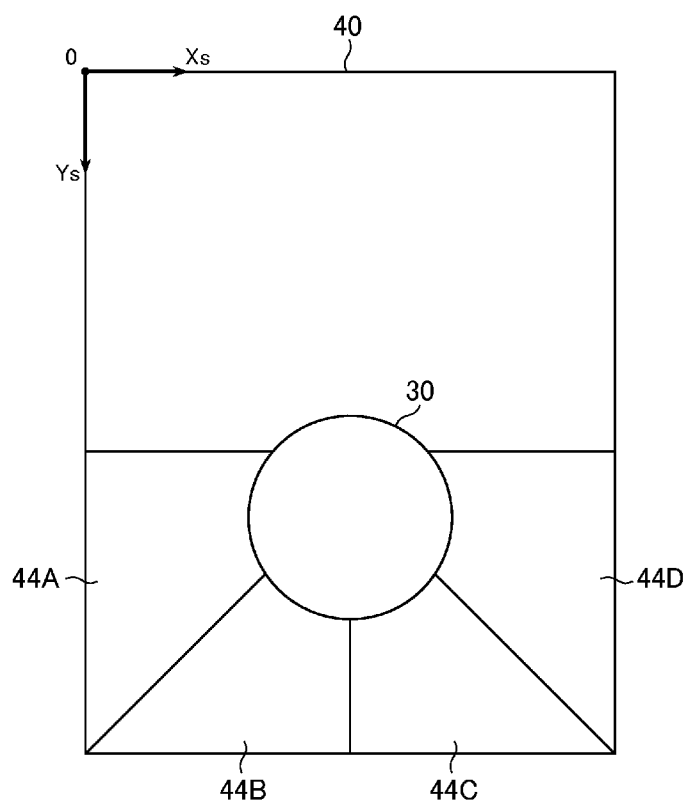
FIG. 12 is a figure for illustrating a method of determining the trajectory of the ball based on a second position.

Further, for example, the contact control unit 62 determines the trajectory of the ball 30 based on the positional relationship between the subject area or the first position and the second position. FIG. 12 is a figure for illustrating a method of determining the trajectory of the ball 30 based on the second position. As illustrated in FIG. 12, for example, an area within the display area of the game screen 40 other than the subject area is divided into a plurality of small areas 44A to 44D (also collectively referred to simply as "small area 44"). The contact control unit 62 determines the trajectory of the ball 30 based on the small area 44 including the second position among the plurality of small area 44 obtained by the division.

In this case, for example, an association between each small area 44 and at least one of the striking strength, the striking direction, and the striking position is also stored in the game data storage unit 50. The contact control unit 62 causes the character 26 to touch the ball 30 based on at least one of the striking strength, the striking direction, and the striking position associated with the small area 44 including the second position.

For example, the striking strength is set larger as the second position becomes closer to the ball 30 or the first position. In other words, the character 26 is to kick the ball 30 harder as the second position becomes closer to the ball 30 or the first position (as the pivot foot of the character 26 becomes closer to the ball 30). Further, for example, the striking direction is set so that the angle between the striking direction and the front direction of the ball 30 (or line of sight of the virtual camera 32) becomes smaller as the second position becomes closer to the ball 30 or the first position. In other words, as the second position becomes closer to the ball 30 or the first position (as the pivot foot of the character 26 becomes closer to the ball 30), the direction in which the character 26 is to kick the ball 30 becomes closer to the front direction (line of sight of the virtual camera 32), and the flying direction of the ball 30 becomes closer to the front direction. Further, for example, a position located away from the second position by a predetermined distance is set as the striking position. In other words, the position of the surface of the ball 30 corresponding to the position located away from the second position touched by the user by the predetermined distance is used as the striking position when the character 26 kicks the ball 30.

Further, the contact control unit 62 may determine the trajectory of the ball 30 based on a combination of the small area 42 including the first position and the small area 44 including the second position. In this case, an association between the combination of the small area 42 and the small area 44 and at least one of the striking strength, the striking direction, and the striking position is stored in the game data storage unit 50. The contact control unit 62 causes the character 26 to touch the ball 30 based on at least one of the striking strength, the striking direction, and the striking position associated with the combination of the small area 42 including the first position and the small area 44 including the second position.

According to the first modified example, the trajectory of the ball 30 can be determined based on the position touched by the user.

Note that the case where the trajectory of the ball 30 is controlled based on the small area including at least one of the first position and the second position is described above, but the trajectory of the ball 30 may be controlled based on at least one of an orientation and a size of a vector that connects the representative point within the subject area or the first position to the second position. Also in this case, for example, an association between the above-mentioned vector and at least one of the striking strength, the striking direction, and the striking position is stored in the game data storage unit 50, and the ball 30 is to be touched based on the association.

(2) Further, for example, the area corresponding to the ball 30 may be changed depending on the second position.

The game device 10 according to the second modified example includes the changing unit 64. The changing unit 64 changes at least one of a position and a size of the subject area based on the second position.

Figure 13:
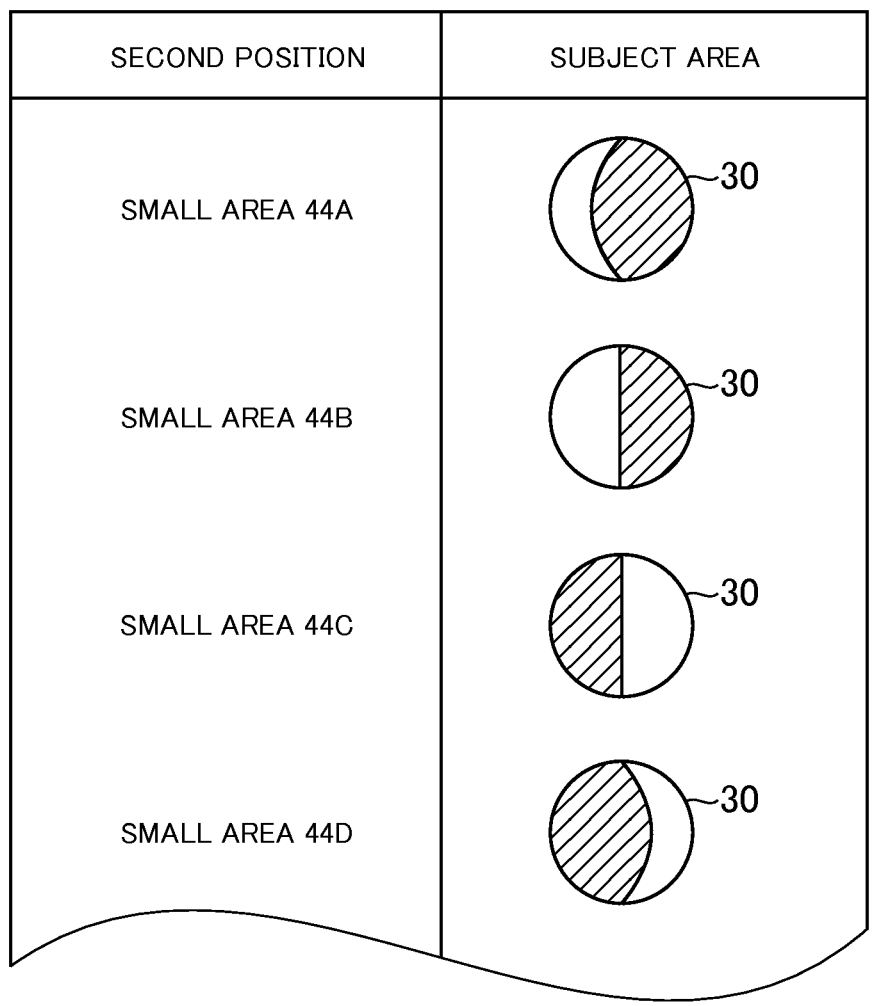
FIG. 13 is a figure illustrating an association between the second position and at least one of a position and a size of a subject area.

FIG. 13 is a figure illustrating an association between the second position and at least one of a position and a size of the subject area. The association is stored in the game data storage unit 50. For example, the changing unit 64 sets the subject area having a size associated with the second position in the position of the subject area (hatch lines of FIG. 13) associated with the second position.

For example, the subject area may be set so that the subject area becomes closer to an edge part of the ball 30 and becomes narrower as the second position becomes farther from the ball 30. Further, for example, the position and the size of the subject area may be set so that an area existing on a side on which the second position exists becomes larger when the subject area is sectioned by a straight line passing through the center point of the ball 30.

The position determining unit 58 according to the second modified example determines whether or not the first position is included in the subject area changed in the above-mentioned manner. The position determining unit 58 determines whether or not the first position exists within the subject area having at least one of the position and the size changed by the changing unit 64.

For example, when it is determined that the first position is included in the subject area having the position or the size changed by the changing unit 64, in the same manner as the control method according to the embodiment, the contact control unit 62 causes the ball 30 to move based on the striking strength, the striking direction, and the striking position. In this case, the ball 30 is moved based on the position touched by the user, and hence the character 26 kicks the ball 30 correctly as instructed by the user.

On the other hand, when it is determined that the first position is not included in the subject area having the position or the size changed by the changing unit 64 (for example, when the first position exists inside the ball 30 but does not exist inside the subject area), the contact control unit 62 restricts the movement of the ball 30. The wording "restricts the movement of the ball" represents suppressing the movement of the ball 30 based on the striking strength, the striking direction, and the striking position, for example, changing the trajectory defined based on the striking strength, the striking direction, and the striking position. In other words, when the position touched by the user does not exist within the subject area having the position or the size changed by the changing unit 64, the ball 30 may move in a direction that is not intended by the user, resulting in a missed kick. In this manner, it is possible to express how the missed kick occurs based on the position (in other words, second position touched by the user) of the pivot foot of the character 26.

According to the modified example (2), the area corresponding to the ball 30 is changed depending on the second position.

(3) Further, for example, the embodiment is described above by taking the case where the character 26 kicks the ball 30 when the ball 30 is touched, but the user may slide the finger on the touch panel 15 to cause the character 26 to kick the ball 30.

The game device 10 according to the third modified example includes the positional change determining unit 66. The positional change determining unit 66 determines whether or not the first position has made a given positional change. The given positional change represents, for example, at least one of a moving distance of the touched position becoming equal to or longer than a reference distance, a change direction of the touched position being a given change direction, and a speed of the touched position becoming equal to or higher than a reference speed.

Based on the second position obtained when it is determined that the first position has made the given positional change, the determination unit 60 determines which of the right hand or the right foot and the left hand or the left foot is used to touch the contact subject (for example, ball 30) in the game.

Figure 14:
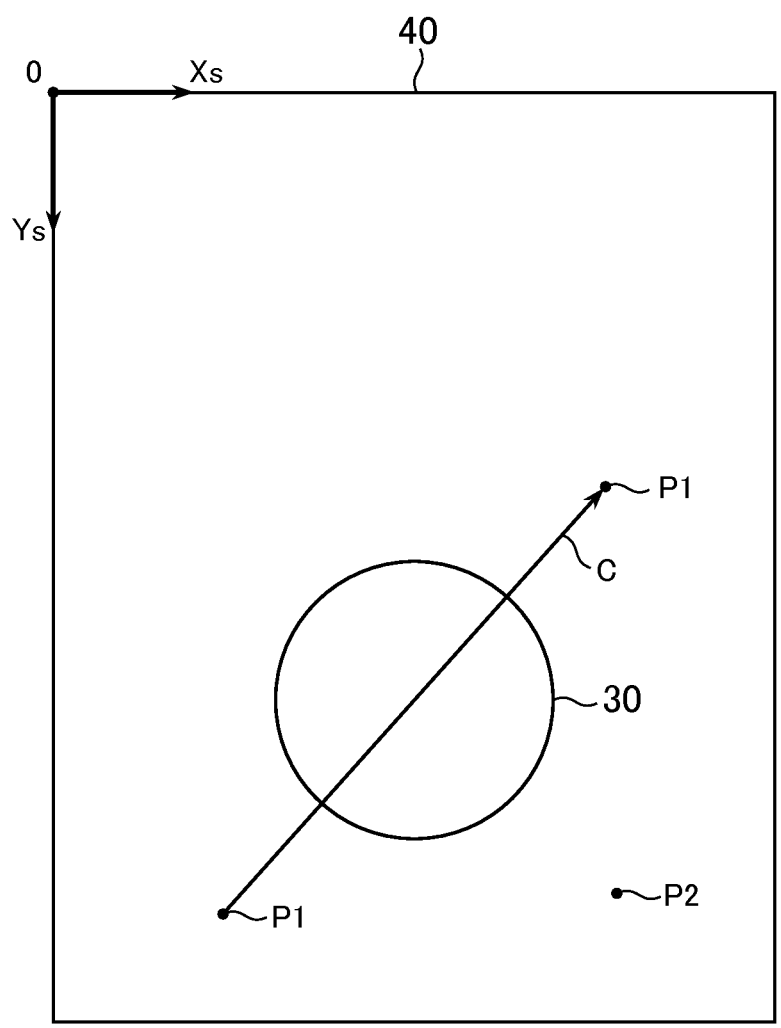
FIG. 14 is a figure for illustrating a method of determining a kicking foot according to the third modified example.

FIG. 14 is a figure for illustrating a method of determining the kicking foot according to the third modified example. In the example of FIG. 14, the position P1 corresponds to the first position, and the position P2 corresponds to the second position. The determination unit 60 determines which of the right foot and the left foot the character 26 is to kick the ball 30 with based on which of the right side and the left side the position P2 exists on relative to a trajectory C used when the position P1 makes the given positional change. For example, it is determined that the character is to kick the ball 30 with the right foot when the position P2 exists on the left side relative to the trajectory C, and when the position P2 exists on the right side relative to the trajectory C, it is determined that the character is to kick the ball 30 with the left foot.

In this case, the trajectory of the ball 30 may differ based on the trajectory C of the position P1. For example, the trajectory C of the position P1 and at least one of the striking strength, the striking direction, and the striking position are stored in the game data storage unit 50 in association with each other. The contact control unit 62 may cause the ball 30 to move based on at least one of the striking strength, the striking direction, and the striking position associated with the trajectory C of the position P1. For example, the striking strength is set larger as a length by which the trajectory C intersects the subject area becomes longer. Further, for example, the striking direction is determined based on the vector of the trajectory C. Further, for example, the striking direction is determined based on a point on a line segment on which the trajectory C intersects the subject area.

Further, for example, the trajectory of the ball 30 may differ based on a positional relationship between the trajectory C of the position P1 and the position P2. The positional relationship between the trajectory C of the position P1 and the position P2 and at least one of the striking strength, the striking direction, and the striking position may be stored in the game data storage unit 50 in association with each other. The contact control unit 62 may cause the ball 30 to move based on at least one of the striking strength, the striking direction, and the striking position associated with the positional relationship between the trajectory C of the position P1 and the position P2. For example, the striking strength is set larger as the trajectory C becomes closer to the position P2. Further, for example, the striking direction is determined based on a vector obtained by correcting the vector of the trajectory C based on the position P2. Further, for example, the striking position is determined based on a position obtained by shifting the point on the line segment on which the trajectory C intersects the subject area toward the position P2 by a predetermined distance.

According to the third modified example, the user can cause the character 26 to kick the ball 30 by sliding the finger on the touch panel 15.

(4) Further, for example, the case where the user designates the second position on the touch panel 15 with the second finger while the first position on the touch panel 15 is kept designated with the first finger is described above, but the second position may be designated after the user designates the first position and releases the first finger from the touch panel 15. In the same manner, the first position may be designated after the user designates the second position and releases the second finger from the touch panel 15.

Further, for example, processing details of the contact control unit 62 are not limited to the above-mentioned embodiment or modified examples. For example, an algorithm used when the character 26 touches the ball 30 with the right foot and an algorithm used when the character 26 touches the ball 30 with the left foot may be provided, and it may be determined which of the algorithms is used to move the ball 30 based on the determination result from the determination unit 60. Further, for example, coefficients of the mathematical expression for determining the trajectory of the ball 30 may change between the case where the character 26 is to touch the ball 30 with the right foot and the case where the character 26 is to touch the ball 30 with the left foot.

Further, for example, the embodiment has been described by taking the case where the ball 30 is moved based on at least one of the striking strength, the striking direction, and the striking position, but factors other than the above-mentioned three factors may be taken into consideration as long as the contact processing is executed by substituting the values of the respective factors regarding the contact of the ball 30 into the mathematical expression. Alternatively, for example, the trajectory of the ball 30 may be calculated by substituting a numerical value indicating a rotation direction of the ball 30, a numerical value indicating a flying angle of the ball 30, and the like into the mathematical expression.

Further, for example, the case where the character 26 placed in the game space 20 moves the ball 30 has been described, but there is no need to place the character 26 in the game space 20. In other words, the character 26 is not necessarily brought into contact with the ball 30 in the game space 20, and the contact processing for the ball 30 based on the given algorithm may be executed in response to the user's touch operation.

Further, for example, the case where the touch panel 15 is used as means for enabling the user to point at the position on the game screen 40 is described above, but various known pointing devices can be applied as the above-mentioned means. For example, a controller incorporating an infrared sensor may be used to point at the position on the game screen 40.

Further, for example, the game space 20 has been described as such a three-dimensional space as illustrated in FIG. 2, but the game space according to the present invention may be a two-dimensional game space in which, for example, positions and the like of the character 26 (28) and the ball 30 are controlled by two coordinate elements.

Figure 15:
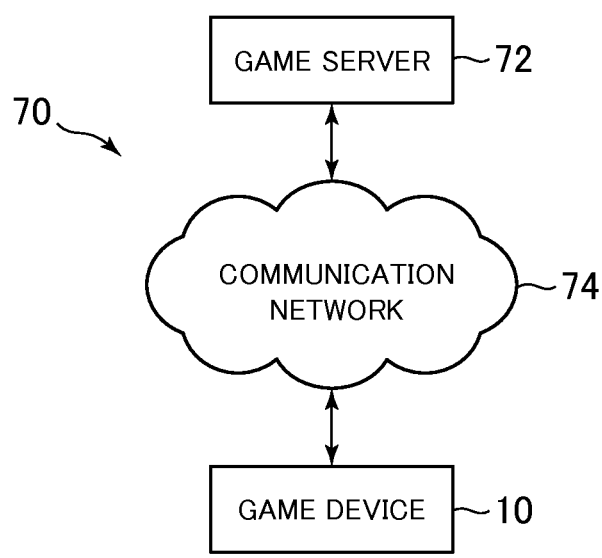
FIG. 15 is a diagram illustrating an overall configuration of a game system.

Further, for example, the present invention can also be applied to a game system. FIG. 15 is a diagram illustrating an overall configuration of the game system. As illustrated in FIG. 15, a game system 70 includes the game device 10 and a game server 72. The game server 72 is, for example, a server computer provided with a control unit and the like.

In the game system 70, the game device 10 and the game server 72 exchange data via a communication network 74, to thereby execute the game.

In the game system 70, the game situation data and the like are stored in a storage unit provided in the game server 72 or a storage unit provided in a device that can be accessed from the game server 72. For example, in the game system 70, data relating to an operation performed in the game device 10 is transmitted from the game device 10 to the game server 72. In the game server 72, the position on the game screen 40 pointed at by the user is identified based on the data transmitted from the game device 10. In the game device 10, the game screen 40 is displayed based on the game situation data transmitted from the game server 72.

In the game system 70, each of the functional blocks is implemented by any one of the game device 10 and the game server 72. In other words, the respective functions illustrated in the functional block diagram may be shared by the game device 10 and the game server 72.

For example, the game data storage unit 50 may be implemented by the game server 72. In this case, storage content of the game data storage unit 50 may be transmitted from the game server 72 to the game device 10.

For example, the executing unit 52 may be implemented by the game server 72. In this case, storage content of the game data storage unit 50 may be transmitted from the game device 10 to the game server 72.

Further, for example, the display control unit 54 may be implemented in the game server 72. In this case, the display control of the game screen 40 is performed by transmitting the image data from the game server 72 to the game device 10.

Further, the position acquiring unit 56, the position determining unit 58, the determination unit 60, and the contact control unit 62 may be implemented in the game server 72. In this case, the game server 72 acquires, from the game device 10, the information relating to the position on the touch panel 15 touched by the user, and determines which of the right foot and the left foot the character 26 is to touch the ball 30 with.

Note that the game server 72 may correspond to the game device according to the present invention. In this case, the respective functions described above are implemented by the game server 72, and the game device 10 transmits the user's operation to the game server 72 and displays the game screen 40 based on the image data received from the game server 72.

Further, of the functions illustrated in the functional block diagram, the essential components are the display control unit 54, the position acquiring unit 56, the position determining unit 58, the determination unit 60, and the contact control unit 62, and the other functions may be omitted.

Further, for example, the present invention can also be applied to a game device for executing a game other than the soccer game. The present invention can be applied to a game in which the contact subject is touched. For example, the present invention can also be applied to a game device for executing a boxing game. In this case, an opponent character is set as the contact subject. It is determined based on a position on the game screen which of the right hand and the left hand is used to touch the opponent character. In this case, the same processing is executed as in the embodiment and the above-mentioned modified examples. For example, the "right foot" and the "left foot" stated in the embodiment and the above-mentioned modified examples can be read as the "right hand" and the "left hand", respectively. Alternatively, for example, the present invention can also be applied to a game device for executing an action game, a role-playing game, or the like.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A game device for executing a game in which a contact subject is touched, the game device comprising:
   a touch screen; and
   at least one microprocessor configured to:
      display an image expressing the contact subject on a game screen using the touch screen;
      acquire a plurality of positions on the game screen, which are designated by a user using the touch screen;
      based on a positional relationship of a first position and a second position among the acquired positions, determine with which limb of a right limb and a left limb the contact subject is to be touched within the game; and
      execute processing for contacting the contact subject within the game using the determined limb based on the determination result,
   wherein:
   the at least one microprocessor determines whether or not the first position is in an area of the game screen corresponding to the image expressing the contact subject; and
   the at least one microprocessor determines, based on the second position obtained in a case where it is determined that the first position is in the area, with which limb of the right limb and the left limb the contact subject is to be touched within the game.

2. The game device according to claim 1, wherein:
   the game comprises a game for causing the contact subject to move; and
   the at least one microprocessor controls a trajectory of the contact subject based on the determination result.

3. The game device according to claim 1, wherein:
   the game comprises a game for causing the contact subject to move; and
   the at least one microprocessor controls a trajectory of the contact subject based on the determination result and at least one of the first position and the second position obtained in a case where determination processing is executed.

4. The game device according to claim 1, wherein:
   the at least one microprocessor determines at least one of a contact strength, a contact direction, and a contact position used in a case where the contact subject is touched, based on at least one of the first position and the second position obtained in a case where determination processing is executed; and
   the at least one microprocessor executes the processing for contacting the contact subject within the game using the determined limb based on the determined at least one of the contact strength, the contact direction, and the contact position.

5. The game device according to claim 1, wherein the at least one microprocessor changes at least one of a position and a size of the area based on the second position,
   wherein the at least one microprocessor determines whether or not the first position is in the changed area.

6. The game device according to claim 1, wherein:
the at least one microprocessor determines whether or not the first position has made a given positional change; and
the at least one microprocessor determines, based on the second position obtained in a case where it is determined that the first position has made the given positional change, with which limb of the right limb and the left limb the contact subject is to be touched within the game.

7. The game device according to claim 1, wherein the right limb comprises a right hand or a right foot, and the left limb comprises a left hand or a left foot.

8. The game device according to claim 1, wherein when the first position is designated in an area to the left of the contact subject on the game screen, and then the second position is designated on the contact subject, the right limb is determined as the limb with which the contact subject is to be touched, and when the first position is designated in an area to the right of the contact subject on the game screen, and then the second position is designated on the contact subject, the left limb is determined as the limb with which the contact subject is to be touched.

9. A game system for executing a game in which a contact subject is touched, the game system comprising a game device and a game server connected via a communication network,
wherein the game device comprises a touch panel, and
wherein the game server comprises at least one microprocessor configured to:
transmit an image expressing the contact subject on a game screen to the game device for display on the game device;
acquire from the game device a plurality of positions, which are designated by a user using the touch panel;
based on a positional relationship of a first position and a second position among the acquired positions, determine with which limb of a right limb and a left limb the contact subject is to be touched within the game; and
transmit to the game device processing for contacting the contact subject within the game using the determined limb based on the determination result,
wherein:
the at least one microprocessor of the game server determines whether or not the first position is in an area of the game screen corresponding to the image expressing the contact subject; and
the at least one microprocessor of the game server determines, based on the second position obtained in a case where it is determined that the first position is in the area, with which limb of the right limb and the left limb the contact subject is to be touched within the game.

10. A game control method for a game in which a contact subject is touched, the game control method comprising:
displaying an image expressing the contact subject on a game screen;
acquiring a plurality of positions on the game screen, which are designated by a user;
based on a positional relationship of a first position and a second position from among the acquired positions, determining with which limb of a right limb and a left limb the contact subject is to be touched within the game; and
executing processing for contacting the contact subject within the game using the determined limb based on the determination result,
wherein:
the determining comprises:
determining whether or not the first position is in an area of the game screen corresponding to the image expressing the contact subject; and
determining, based on the second position obtained in a case where it is determined that the first position is in the area, with which limb of the right limb and the left limb the contact subject is to be touched within the game.

11. A non-transitory computer-readable information storage medium having recorded thereon a program for causing a computer for executing a game in which a contact subject is touched, to when executed:
display an image expressing the contact subject on a game screen;
acquire a plurality of positions on the game screen, which are designated by a user;
based on a positional relationship of a first position and a second position among the acquired positions, determine with which limb of a right limb and a left limb the contact subject is to be touched within the game; and
execute processing for contacting the contact subject within the game using the determined limb based on the determination result,
wherein:
the computer determines with which limb the contact subject is to be touched by:
determining whether or not the first position is in an area of the game screen corresponding to the image expressing the contact subject; and
determining, based on the second position obtained in a case where it is determined that the first position is in the area, with which limb of the right limb and the left limb the contact subject is to be touched within the game.

12. A game device for executing a game in which a contact subject is touched, the game device comprising:
a display control unit that displays an image expressing the contact subject on a game screen;
a unit that acquires a plurality of positions on the game screen, which are designated by a user;
a determination unit that based on a positional relationship of a first position and a second position among the acquired plurality of positions, determines with which limb of a right limb and a left limb the contact subject is to be touched within the game; and
a contact control unit that executes processing for contacting the contact subject within the game using the determined limb based on the determination result,
wherein:
the determination unit determines whether or not the first position is in an area of the game screen corresponding to the image expressing the contact subject; and
the determination unit determines, based on the second position obtained in a case where it is determined that the first position is in the area, with which limb of the right limb and the left limb the contact subject is to be touched within the game.

13. A game device for executing a game in which a contact subject is touched, the game device comprising at least one microprocessor configured to:
display an image expressing the contact subject on a game screen;
acquire a plurality of positions on the game screen, which are designated by a user;

based on a positional relationship of a first position and a second position among the acquired positions, determine with which limb of a right limb and a left limb the contact subject is to be touched within the game; and execute processing for contacting the contact subject within the game using the determined limb based on the determination result, wherein:

the at least one microprocessor determines whether or not the first position is in an area of the game screen corresponding to the image expressing the contact subject; and the at least one microprocessor determines, based on the second position obtained in a case where it is determined that the first position is in the area, with which limb of the right limb and the left limb the contact subject is to be touched within the game.

* * * * *